(No Model.)

S. S. REMBERT.
VEHICLE WHEEL.

No. 258,474. Patented May 23, 1882.

WITNESSES:
Fred. G. Dieterich.
P. C. Dieterich.

INVENTOR.
S. S. Rembert,
by A. Snow & Co.
ATTORNEYS.

N. PETERS. Photo-Lithographer, Washington, D. C.

UNITED STATES PATENT OFFICE.

SAMUEL S. REMBERT, OF WOODSTOCK, TENNESSEE.

VEHICLE-WHEEL.

SPECIFICATION forming part of Letters Patent No. 258,474, dated May 23, 1882.

Application filed October 17, 1881. (No model.)

*To all whom it may concern:*

Be it known that I, SAMUEL S. REMBERT, of Woodstock, Shelby county, Tennessee, have invented certain Improvements in Vehicle-Wheels, of which the following is a specification.

This invention has for its object to provide a simple, durable, light, and inexpensive vehicle-wheel.

Figure 1:
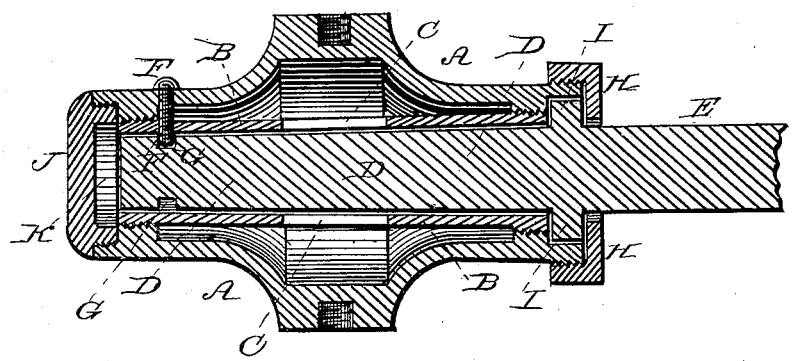
Figure 2:
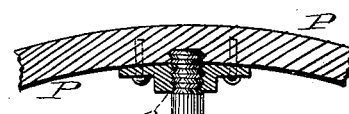
Figure 4:
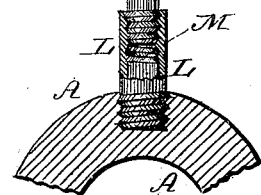
Figure 3:
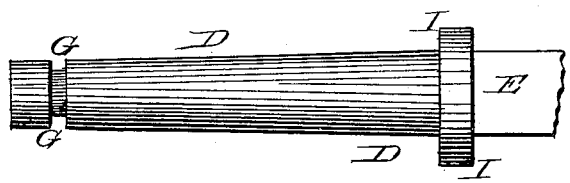

In the annexed drawings, Figure 1 is a longitudinal sectional view of the hub; Fig. 2, a side view of the spindle-box detached; Fig. 3, a like view of the spindle; and Fig. 4, a sectional view, showing the method of securing the spokes.

Referring by letter to the drawings, A designates a hollow casting, forming the hub, in which is arranged a cylindrical spindle-box, B, provided with longitudinal slots C, through which the lubricating matter contained inside the casting A may pass onto the spindle D of axle E. To removably secure the hub on the spindle, a pin or screw, F, is provided, which is inserted through the casting A and box B, with its inner end entering an annular circumferential groove, G, in the spindle near its outer end. A cap, H, mounted on the axle, is also provided to screw over the inner end of the casting and inclose the annular shoulder I on the spindle. It will thus be seen that by withdrawing the screw F and loosening cap H the hub can be drawn off the spindle when desired.

J is an end cap, which screws onto casting A and completely closes the outer end thereof, its inner recess, K, also forming a reservoir for the lubricants.

L designates a series of short hollow cylindrical sleeves, which screw into the hub with a right-hand screw, and are likewise screw-threaded on their inside, M. The long spokes N screw into these with a right-hand screw, and at their outer ends, O, into the rim P with a left-hand screw. In this manner any one of the spokes may be readily removed without disturbing the others, and the greatest strength is obtained at the hub, where the strain has to be borne.

The construction and advantages of my invention will be readily understood.

The device is simple, the spokes adjustable, and the device self-lubricating.

I claim and desire to secure by Letters Patent—

1. The combination, with the hub having the cylindrical sleeves L screw-threaded on their inside and screwed into the hub, of the spokes having their ends screw-threaded in opposite directions, one end adapted to enter the sleeve and the other to enter the rim of the wheel, as and for the purpose specified.

2. The herein-described hub, consisting of the casting A, having arranged inside the cylindrical longitudinally-slotted spindle-box B and cap J at its outer end, cap H at its inner end, and screw F, passing through the casting and spindle-box and adapted to enter a circumferential annular groove in the spindle, as and for the purpose shown and specified.

SAMUEL S. REMBERT.

Witnesses:
B. F. HAWKINS,
LOUIS FRITZ.